(12) United States Patent
Brockelsby et al.

(10) Patent No.: US 8,220,761 B2
(45) Date of Patent: Jul. 17, 2012

(54) SUPPORT FOR MOUNTING ELECTRICAL BOX IN BLOCK WALL

(76) Inventors: Pete Brockelsby, Canal Winchester, OH (US); Nick Wilhoit, Frazeysburg, OH (US)

( * ) Notice: Subject to any disclaimer, the term of this patent is extended or adjusted under 35 U.S.C. 154(b) by 199 days.

(21) Appl. No.: 12/567,125

(22) Filed: Sep. 25, 2009

(65) Prior Publication Data
US 2010/0078535 A1 Apr. 1, 2010

Related U.S. Application Data

(60) Provisional application No. 61/100,304, filed on Sep. 26, 2008.

(51) Int. Cl.
*E04G 5/06* (2006.01)
*H01H 9/02* (2006.01)
*H05K 7/14* (2006.01)

(52) U.S. Cl. ............... 248/224.8; 248/27.3; 248/906; 174/58; 52/220.2; 52/712

(58) Field of Classification Search ............... 248/224.8, 248/906, 216.1, 216.4, 229.16, 229.26, 225.21, 248/228.7, 231.81, 27.1, 27.3; 174/58, 50, 174/535; 52/220.1, 220.2, 712
See application file for complete search history.

(56) References Cited

U.S. PATENT DOCUMENTS

| 2,665,865 A * | 1/1954 | Bell ............................ 248/27.1 |
| 3,180,595 A * | 4/1965 | Birkhold et al. ............. 248/27.3 |
| 3,674,913 A * | 7/1972 | Yates ............................ 174/503 |
| 6,111,197 A | 8/2000 | Layne |
| 6,388,192 B1 | 5/2002 | Layne |
| 6,648,277 B2 * | 11/2003 | De Leu ........................ 248/27.1 |
| 7,432,440 B2 * | 10/2008 | Hull et al. ....................... 174/50 |

\* cited by examiner

*Primary Examiner* — Anita M King
(74) *Attorney, Agent, or Firm* — Standley Law Group LLP

(57) ABSTRACT

A junction box is adapted for flush and straight mounting in a hollow core of a masonry block, without the use of debris or the like in the core. The junction box has a thickness along a pair of side walls thereof defined by a separation of a generally-open front face from a generally-closed rear face. The junction box has a resilient tail-like member that extending away from the rear face of the junction box. The tail-like member has first and second ends with at least one bend or curvature along an intermediate portion and a length such that, in a compressed state, the second end bears against a first inside wall of the hollow core and at least portions of the junction box front face bear against an opposing second inside wall of the hollow core.

16 Claims, 4 Drawing Sheets

SUPPORT FOR MOUNTING ELECTRICAL BOX IN BLOCK WALL

CROSS-REFERENCE TO RELATED APPLICATIONS

This application claims priority of U.S. Provisional Patent Application No. 61/100,304, filed Sep. 26, 2008, which is incorporated by reference as if fully recited herein.

TECHNICAL FIELD

The disclosed embodiments relate to a device for supporting an electrical junction box in a wall that comprises masonry block.

BACKGROUND OF THE ART

Masonry blocks are known in the art. A typical masonry block may vary in size, but the differing sizes will be similar in design. A masonry block is a generally hollow unit, usually made of cement. The hollow cores in the block are referred to as "cores." The outside surfaces are called "face shells" and the inner and outer face shells are joined by cross webs that connect the face shells. In a common deign, the two face shells are connected by three cross webs (one at each end and one in the middle. The middle cross web divides the interior of the block into a pair or cores.

In construction, courses of block are laid horizontally, with mortar placed between adjacent blocks in a course. Mortar is also placed between vertical courses of block, with a pair of adjacent vertical courses usually offset by one-half of a block width, so that the inner cores are vertically aligned. Block of this type is typically laid with a single thickness of block, a so-called "single wythe" wall, but if can be laid with two or more adjacent wythes.

Many building specifications require that all boxes mounted in a masonry wall must be mounted in a flush and straight manner with no debris in the core. However, the hollow cores in which the boxes are mounted provide no support for the box.

It is therefore an unmet advantage of the prior art to provide a device that is interposed between a conventional junction box and a masonry block to provide this support.

SUMMARY OF THE INVENTION

This and other unmet advantages are provided by the device and method described and shown in more detail below. Exemplary embodiments may be directed to an improved arrangement for mounting a junction box in a hollow core of a masonry block, wherein the junction box having a thickness along a pair of side walls thereof defined by a separation of a generally-open front face from a generally-closed rear face. The improved arrangement may include a resilient tail-like member, extending away from the rear face of the junction box. The tail-like member may have first and second ends with at least one bend or curvature along an intermediate portion between the ends, the tail-like member having a length such that, in a compressed state of the tail-like member, the second end bears against a first inside wall of the hollow core and at least portions of the junction box front face bear against an opposing second inside wall of the hollow core.

In some exemplary embodiments, the arrangement includes a fastener that secures the first end of the tail-like member to the junction box. Exemplary embodiments may include a U-shaped band, secured to the tail-like member, having arms that wrap around the side wall and a cross portion that passes across the rear face of the junction box to secure the tail-like member to the junction box. In some exemplary embodiments, the arms are angled slightly toward each other to engage the side walls of the junction box. Exemplary embodiments may include means for engaging the sides of the junction box disposed along the arms. Also, exemplary embodiments may include means for engaging the masonry block disposed at the ends of the arms of the U-shaped band.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION OF A PREFERRED EMBODIMENT

Figure 1:
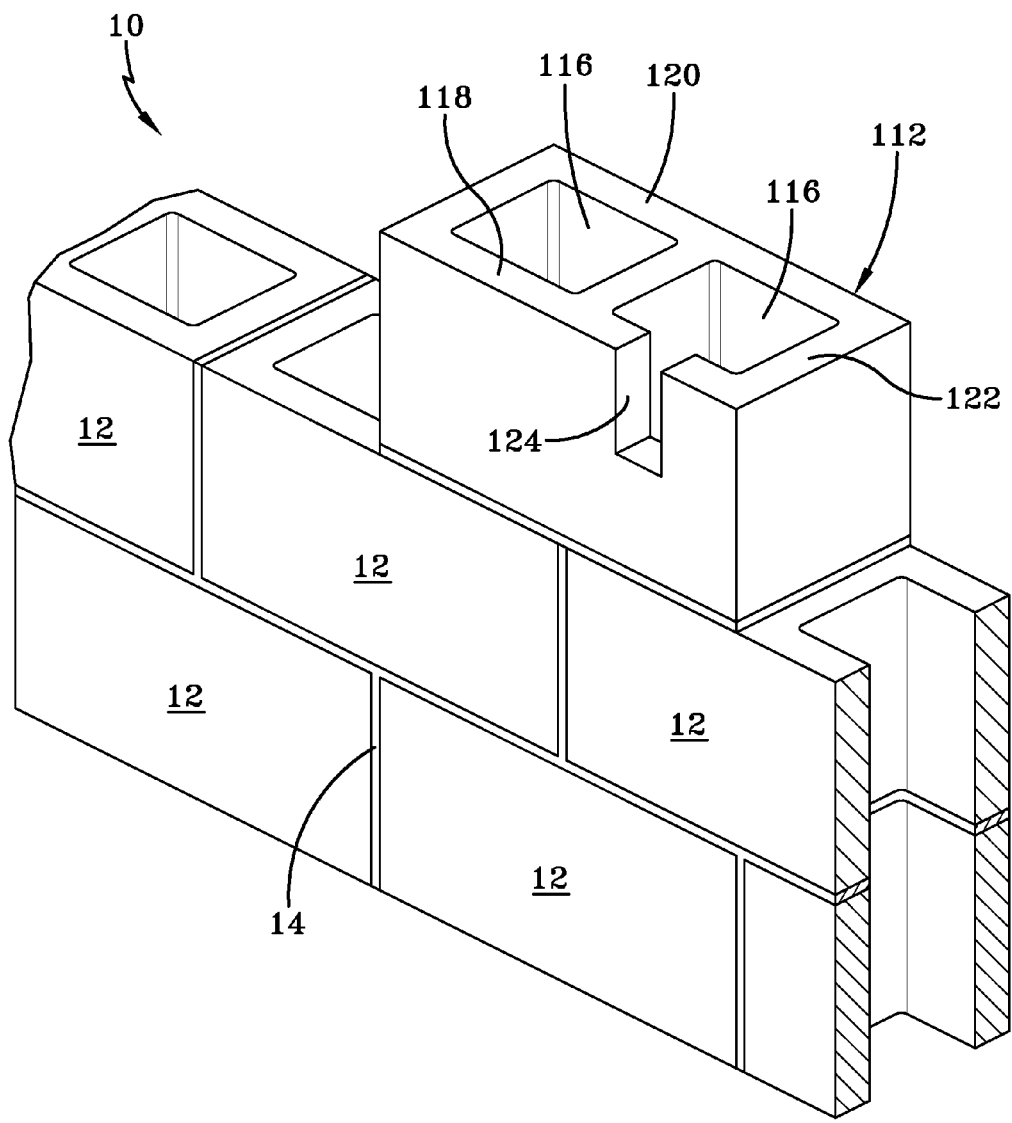
FIG. 1 is a sectioned perspective view of a single wythe masonry block wall, showing a block with a cut-out portion for placement of a junction box thereon, as known in the prior art.

FIG. 1 is a portion of a single-wythe wall 10 constructed of masonry blocks as are known in the art. While most of the blocks 12 are shown in an assembled condition with mortar 14 in place, one block, identified with reference numeral 112, positioned on the upper course, is shown in more detail, so that the features that are used in the present invention are visible. The block 112 has two hollow cores 116 and two face shells 118, 120 with the inner face shell 118 joined by cross webs 122 to outer face shell 120. Of the two cores, one 118 is shown with a cut-out portion, providing a mounting hole 124 for placement of a junction box, especially an electrical junction box, as will be shown in subsequent drawings. For the purpose of illustration, the mounting hole 124 is formed by removing a rectangular solid portion from a face shell, starting at a top edge. This removal is accomplished by known construction techniques.

Boxes for installation in masonry walls are known and standardized in the art. In a 4" block wall, it is customary to install a box that is nominally 2.5" deep, while in a 6 or 8" block wall, it is customary to install a box that is 3.5" deep. More particular detail may be found at a number of sources, such as the RACO® product catalog, available from the RACO division of Hubbell Inc., located in South Bend, Ind. In addition to single gang boxes, such as RACO products 695 or 8695, double gang boxes, such RACO product 696, may also be used in association with the inventive device described below.

Figure 2:
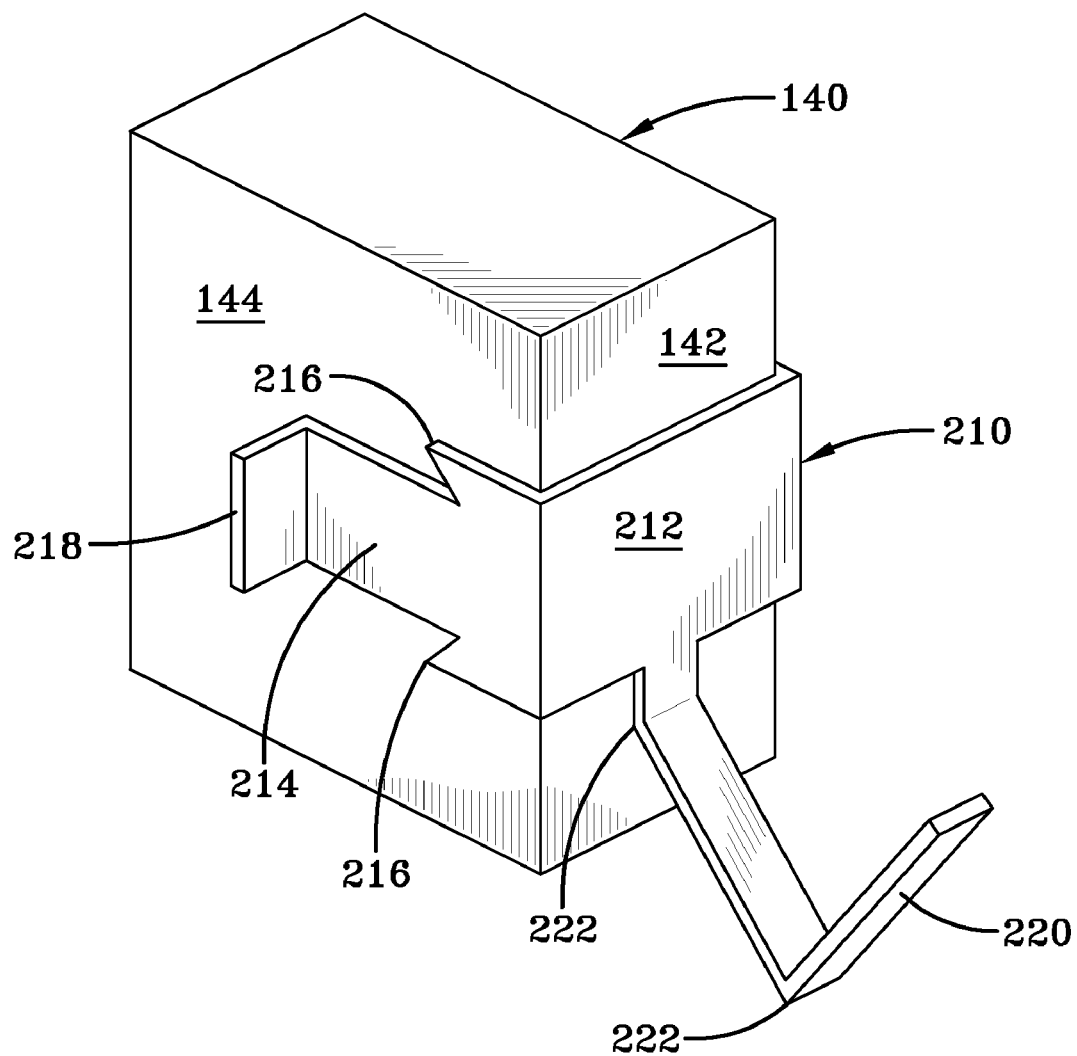
FIG. 2 is a rear perspective view of a first embodiment device shown in engagement with a junction box, although isolated from a masonry block.

Directing attention now to FIG. 2, an embodiment 210 is shown in place on a generalized masonry junction box 140, with the rear (non-open) side of the box facing outwardly. The device 210 has a U-shaped horizontal band 212 that matches very closely the width of the box rear face 142, with a pair of arms 214 (only one of which is shown in FIG. 2) that are generally parallel, but are normally slightly angled towards each other by a few degrees. Each of the arms 214 is provided with means for engaging the side walls 144 of the box 140. In the particular embodiment shown, the arms 214 narrow by a step change in height as they run along the depth of the masonry box with which they are associated, with one means for engaging provided at the point 216 of the step change. An example of an engaging means at this point 216 is an inwardly directed prong. Further, a means for engaging the masonry junction box 140 may also be outwardly directed ears that would be placed at the distal end 218 of each arm 214.

A further feature of the device 210 is a tail-like member 220 that extends downwardly and away from the masonry junction box 140. In embodiment 210, the tail-like member 220 is formed integrally with the band 212. In other embodiments, the tail-like portion member may be attached to portion 212. Tail-like member 220 has at least one bend or curvature 222 formed in it, so that it may be compressed as it is positioned between the junction box 140 and an inside wall of a core of a masonry block. The tail-like portion 220 should be sized and shaped so that placement of the junction box 140 causes a compression, as measured in the direction normal to the rear face of the junction box 140, on the order of at least 5% and less than about 15% in the tail-like portion 220.

To provide the resilience needed to properly function, at least the arms 214 and tail-like member 220 should be manufactured from a material such as a spring metal or a resilient thermoplastic polymer.

Figure 3:
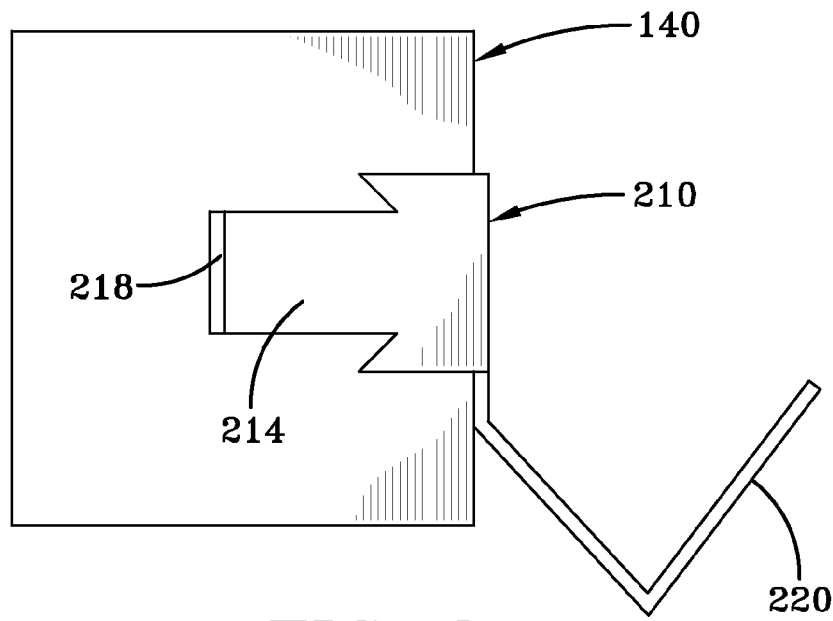
FIG. 3 is a left side elevation view of the FIG. 2 embodiment.

FIG. 3 shows further detail of the embodiment 210 in association with a junction box 140, taken from the left side of FIG. 2. One of the arms 214 and the tail-like member 220 are seen.

Figure 4:
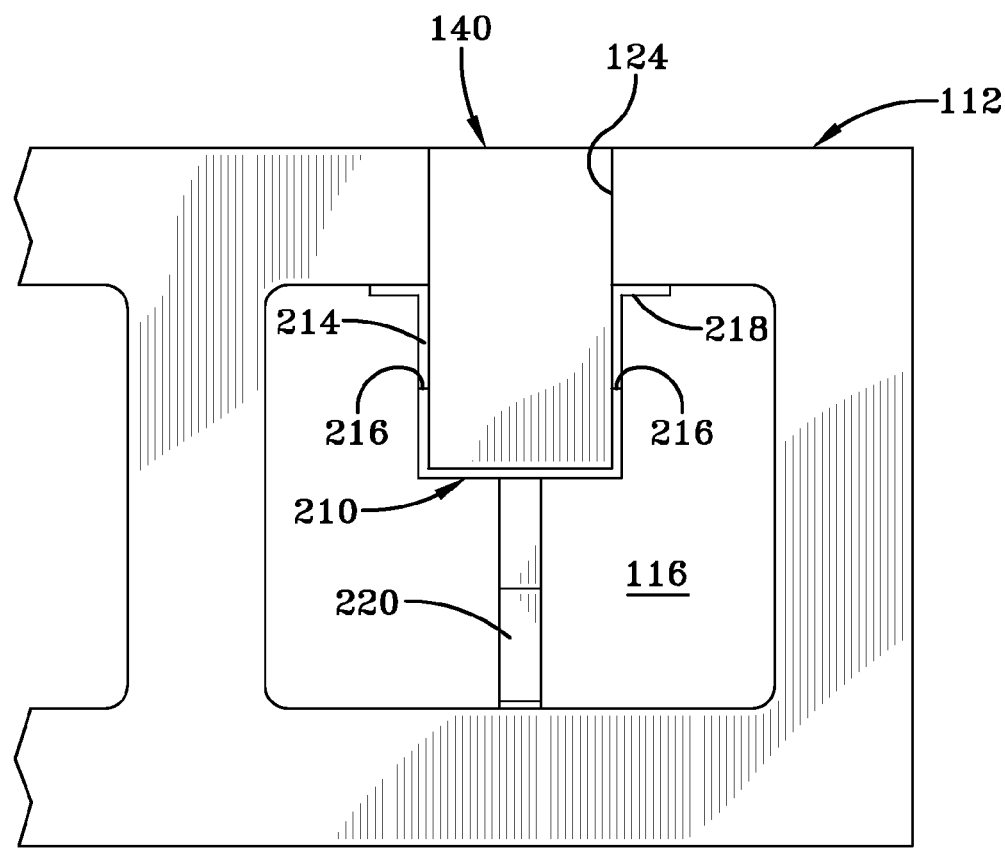
FIG. 4 is a top plan view of the FIG. 2 embodiment, showing operative engagement of the embodiment with both a masonry block and a junction box.

Even more details are seen in FIG. 4, which shows as embodiment 210, viewed from the top with a junction box 140 positioned in a core 116 of a masonry block 112 of the type shown in FIG. 1

Figure 5:
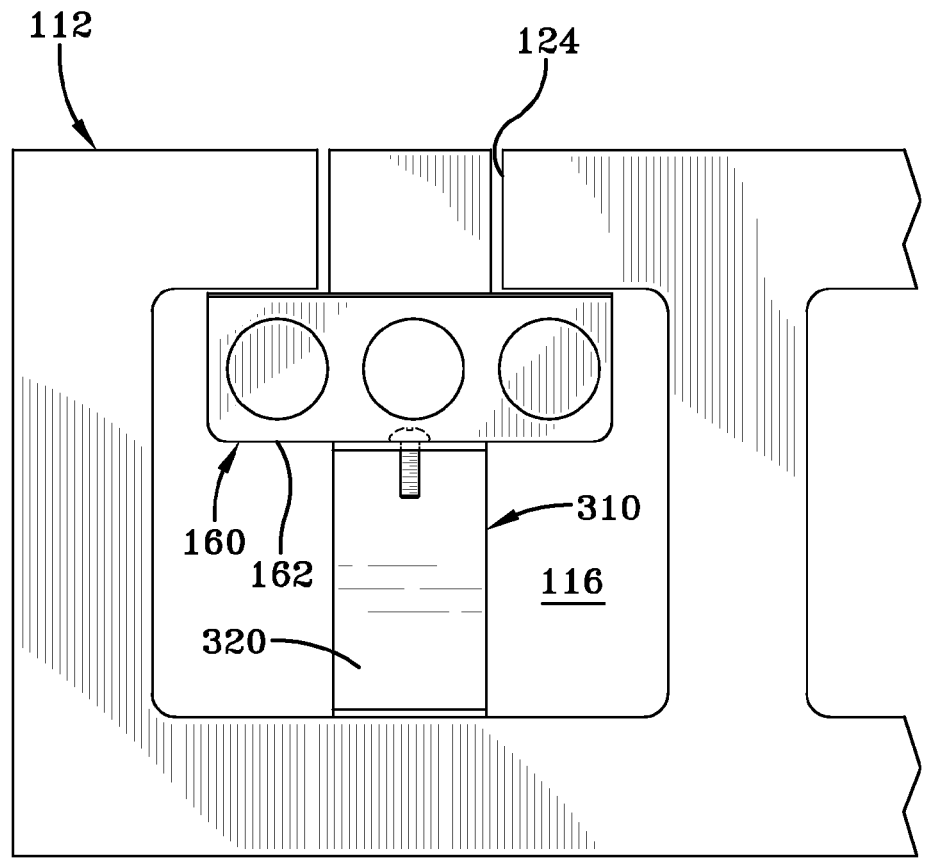
FIG. 5 is a top plan view of a second embodiment of the invention showing operative engagement of the embodiment with a masonry block and a square type junction box.
Figure 6:
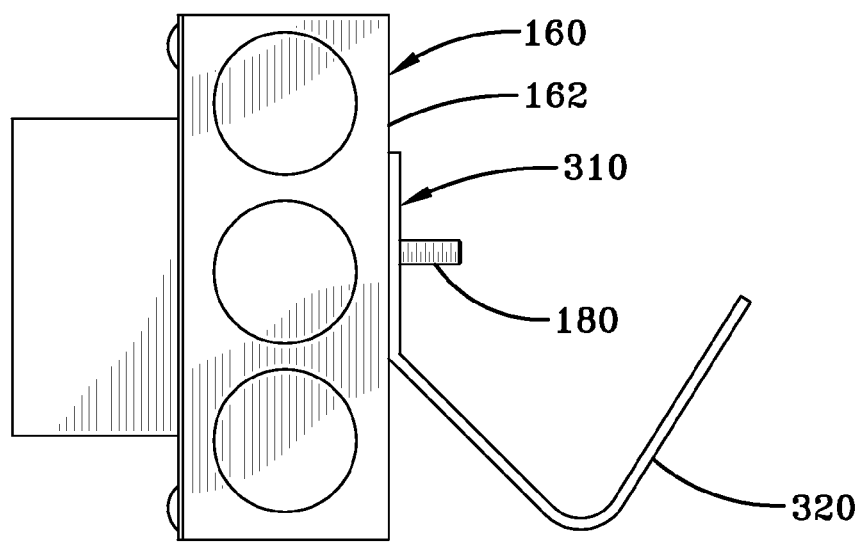
FIG. 6 is a left side elevation view of the FIG. 5 embodiment.

A further embodiment 310 is shown in top view in FIG. 5. In this embodiment, a square junction box 160, a known variation of the junction box 140, is shown being mounted in a hollow core 116 of a masonry block 112 having a mounting hole 124 with a width that is significantly smaller than the width of the box 160. In this case, the embodiment 310 comprises the tail-like member 320, which, instead of being integral with a U-shaped band that engages the box 160, is directly attached to the rear surface 162 of the box, typically using a fastener such as a screw, a rivet, or another known fastener. In this embodiment 310, the wider body of the box 160 bears against the inner wall of the core 116 at the inner face (the face through which the mounting hole 124 is formed), so that the body of the junction box serves the function of the ears in the earlier embodiment and the sides of the junction box serve the function of the arms in the earlier embodiment. A side view of this embodiment 310 is presented as FIG. 6, isolated from the masonry block in the manner of FIGS. 2 and 3. The screw 180 that attaches the embodiment 310 to the junction box 160 is clearly seen. In a yet further variation of this embodiment, the resilient tail-like member 320 is integrally formed on the rear face 162 of the junction box While the embodiments disclosed herein have been shown relative to a single wythe wall 10 as shown in FIG. 1, it is understood that the embodiments would be readily applicable to a double wythe wall (or any wall have plural wythes), with the embodiment being used on a block on an outwardly facing face sheet of the wall.

Having shown and described exemplary embodiments of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. An improved arrangement for mounting a junction box in a hollow core of a masonry block, the junction box having a thickness along a pair of side walls thereof defined by a separation of a generally-open front face from a generally-closed outside rear face, the improvement comprising:
   a resilient tail-like member, extending away from the outside rear face of the junction box, the tail-like member having first and second ends with at least one bend or curvature along an intermediate portion between the ends, the tail-like member having a length such that, in a compressed state of the tail-like member, the second end bears against a first inside wall of the hollow core and at least portions of the junction box front face bear against an opposing second inside wall of the hollow core; and
   a U-shaped band, secured to the tail-like member, having arms that wrap around the side wall and a cross portion that passes across the rear face of the junction box to secure the tail-like member to the junction box.

2. The arrangement of claim 1, wherein:
   the arms are angled slightly toward each other to engage the side walls of the junction box.

3. The arrangement of claim 1, further comprising:
   means for engaging the sides of the junction box disposed along the arms.

4. The arrangement of claim 3, wherein:
   the means for engaging is an inwardly directed prong.

5. The arrangement of claim 1, further comprising:
   means for engaging the masonry block disposed at the ends of the arms of the U-shaped band.

6. The arrangement of claim 1, wherein:
   the tail-like member is formed integrally with the band.

7. The arrangement of claim 1, wherein:
   the tail-like member is integrally formed on the outside rear face of the junction box.

8. An improved arrangement for mounting a junction box in a hollow core of a masonry block, the junction box having a thickness along a pair of side walls thereof, the thickness defined by a separation of a generally-open front face from a generally-closed outside rear face, the improvement comprising:
   a resilient tail-like member, extending away from the outside rear face of the junction box, the tail-like member having first and second ends with at least one bend or curvature along an intermediate portion between the ends, the tail-like member having a length such that, in a compressed state of the tail-like member, the second end bears against a first inside wall of the hollow core and at least portions of the junction box front face bear against an opposing second inside wall of the hollow core;
   a U-shaped horizontal band secured to the tail-like member, having arms angled slightly toward each other to engage the side walls of the junction box and that wrap around the side wall and a cross portion that passes across the rear face of the junction box to secure the tail-like member to the junction box; and means for engaging the sides of the junction box, disposed along the arms.

9. The arrangement of claim 8, further comprising:
a fastener that secures the first end of the tail-like member to the U-shaped horizontal band.

10. The arrangement of claim 8, wherein:
the means for engaging is an inwardly directed prong.

11. The arrangement of claim 8, further comprising:
means for engaging the masonry block disposed at the ends of the arms of the U-shaped band.

12. The arrangement of claim 8, wherein:
the tail-like member is formed integrally with the band.

13. The arrangement of claim 8, wherein:
the tail-like member compresses between at least 5% and less than about 15% when placed between the junction box and an inside wall of the a core of the masonry block.

14. A method for mounting a junction box in a hollow core of a masonry block, comprising the step of:
providing the masonry block with a mounting hole formed in a face of the hollow core;
providing an improved junction box arrangement according to claim 1, the junction box having a width that exceeds the width of the mounting hole; and
engaging the improved junction box arrangement in the hollow core, the front face of the arrangement engaging the masonry block around the mounting hole and the resilient tail-like member, in a compressed condition, engaging an opposing interior wall of the masonry block, the tail-like member being compressed, in a dimension normal to the rear face of the junction box arrangement, in the range of about 5% to about 15% from the dimension when in an uncompressed condition.

15. An improved arrangement for mounting a junction box in a hollow core of a masonry block, the junction box having a thickness along a pair of side walls thereof defined by a separation of a generally-open front face from a generally-closed outside rear face, the improvement comprising:
a resilient tail-like member, extending away from the outside rear face of the junction box, the tail-like member having first and second ends with at least one bend or curvature along an intermediate portion between the ends, the tail-like member having a length such that, in a compressed state of the tail-like member, the second end bears against a first inside wall of the hollow core and at least portions of the junction box front face bear against an opposing second inside wall of the hollow core; and
a fastener that secures the first end of the tail-like member to the junction box.

16. An improved arrangement for mounting a junction box in a hollow core of a masonry block, the junction box having a thickness along a pair of side walls thereof defined by a separation of a generally-open front face from a generally-closed outside rear face, the improvement comprising:
a resilient tail-like member, extending away from the outside rear face of the junction box, the tail-like member having first and second ends with at least one bend or curvature along an intermediate portion between the ends, the tail-like member having a length such that, in a compressed state of the tail-like member, the second end bears against a first inside wall of the hollow core and at least portions of the junction box front face bear against an opposing second inside wall of the hollow core, the tail-like member being compressed between at least 5% and less than about 15% when placed between the junction box and an inside wall of the a core of the masonry block.

\* \* \* \* \*